United States Patent [19]

Wenzl et al.

[11] 4,175,438

[45] Nov. 27, 1979

[54] TEMPERATURE MEASURING PROBE

[75] Inventors: Josef Wenzl, Hebertshausen; Günter Meikis, Karlsfeld, both of Fed. Rep. of Germany

[73] Assignee: Motoren- und Turbinen-Union Munchen GmbH, Fed. Rep. of Germany

[21] Appl. No.: 897,059

[22] Filed: Apr. 17, 1978

[30] Foreign Application Priority Data

Apr. 16, 1977 [DE] Fed. Rep. of Germany ....... 2716884

[51] Int. Cl.² .................................................. G01K 1/12
[52] U.S. Cl. ............................ 73/359 R; 73/362 AR; 136/233; 338/28
[58] Field of Search .......... 73/343, 359, 361, 362 AR; 136/230, 233; 338/28, 30

[56] References Cited

U.S. PATENT DOCUMENTS

| 3,045,487 | 7/1962 | Raezler | 73/359 |
| 3,250,125 | 5/1966 | Bonn | 73/359 |
| 3,301,715 | 1/1967 | Gerrard | 73/361 |
| 3,334,520 | 8/1967 | Putman | 73/359 |

Primary Examiner—S. Clement Swisher
Attorney, Agent, or Firm—Craig and Antonelli

[57] ABSTRACT

A temperature measuring probe which includes thermo-wires extending between bead-like temperature sensors and a coupling device which connects the probe to indicating or control equipment. A terminal member is provided at one end of the probe body with an arc-shaped transition member being provided between the probe body and the terminal member. The transition member has a substantially round cross-sectional configuration with the terminal member having a shallow rectangular cross-sectional configuration so that a substantially laminar flow of coolant through the probe body is achieved.

11 Claims, 3 Drawing Figures

TEMPERATURE MEASURING PROBE

The present invention relates to a measuring arrangement and, more particularly, to a measuring probe for measuring relatively high temperatures.

In, for example, combustion chamber experiments, the exhaust gas temperatures may reach up to about 2,000° K. and it has been proposed to measure such temperatures by measuring probes equipped with thermo-wires of a precious metal.

The aim underlying the present invention essentially resides in providing a temperature measuring probe equipped with thermo-wires of precious metal which satisfies extreme requirements in an optimum manner with respect to life of the probe, ease of maintenance and repair, and accuracy of operation even under high pressures and high-speed flow.

In accordance with advantageous features of the present invention, a temperature measuring probe having thermo-wires of a precious metal is provided with the thermo-wires passing through a tubular probe body between temperature sensors, formed as beads, exposed to the flow of a medium being measured and couplings for connecting the probe to indicating and/or control equipment. The couplings and temperature sensors are arranged in parallel planes laterally offset from one another with the actual probe body extending in a plane of the couplings. A terminal member is provided at the bottom end of the probe body with the terminal member extending at a right angle to the probe body between the two planes. The probe body is constructed so as to carry a coolant to thereby cool the thermo-wires.

To ensure a substantially laminar flow of coolant in the probe, according to the present invention, a well-rounded transition member having an arcuate shape is provided between the probe housing and the terminal member with the terminal member having a shallow rectangular cross-sectional configuration.

In accordance with further advantageous features of the present invention, each of the thermo-wires is accommodated in an inner tube member which, in turn, is accommodated in an outer tube member with the tubes being dimensioned so that a space is defined between the inner and outer tubes and between the outer tube and the probe housing with the space between the inner and outer tubes serving for the flow of coolant, while the space between the outer tube and the probe housing serves for a coolant return.

According to the present invention, the coolant supply and coolant discharge are provided at an end of the probe housing which is remote from the terminal member.

The inner tube, according to the present invention, merges into a ceramic sleeve at an end adjacent a temperature sensor with the ceramic sleeve extending with a radial clearance through a metal outer end face of the terminal member and surrounds the thermo-wire in close proximity to the temperature sensor.

Additionally, in accordance with the present invention, the thermo-wire, inner tube and ceramic sleeves each pass with a radial clearance in the outer tube and the end face of the terminal member so as to be axially displaceable in the outer tube and end face of the terminal member of the probe housing, thereby permitting thermal expansion without stress.

To facilitate connection of the top end of the thermo-wires to the coupling, according to the present invention, a loop is provided near the end adjacent the coupling and before connection to the coupling.

According to yet a further feature of the present invention, the bead-shaped temperature sensor, freely exposed to the stream of the medium, is supported on a head piece or member of the thermo-wire by means of at least two support wires conducting the measured valves to the indicator and/or control device and at least two other purely supporting wires. Preferably, one of the support wires carrying the measured value to the indicator and/or control device is a platinum wire, while the other three support wires consist of a platinum-rhodium alloy.

In accordance with the present invention, the bead sensor, freely exposed to the stream of the medium, is jacketed in a ceramic material with the jacket preferably consisting of an aluminum oxide applied in the form of high purity aluminum. During the application and conversion of the pure aluminum to aluminum oxide, the purely supporting wires are utilized for the supply and discharge of heat, while the other two wires are connected as sensors to a control circuit to give optimum thickness of the ceramic protective coating of, preferably, aluminum oxide.

According to a further feature of the present invention, the probe is constructed as a comb-type probe and the probe housing contains thermo-wires and temperature sensors which correspond in number to the temperature profile to be measured.

Accordingly, it is an object of the present invention to provide a temperature measuring probe which avoids by simple means the shortcomings and disadvantages encountered in the prior art.

Another object of the present invention resides in providing a temperature measuring probe which ensures a satisfactory laminar flow of the coolant therealong, as well as a satisfactory heat transfer and heat dissipation.

A further object of the present invention resides in providing a temperature measuring probe which is simple in construction and, therefore, relatively inexpensive to manufacture.

An additional object of the present invention resides in providing a temperature measuring probe which can be subjected to extremely high temperatures and yet function reliably under all operating conditions.

These and other objects, features and advantages of the present invention will become more apparent from the following description when taken in connection with the accompanying drawings which show, for the purposes of illustration only, one embodiment in accordance with the present invention, and wherein.

Figure 1:
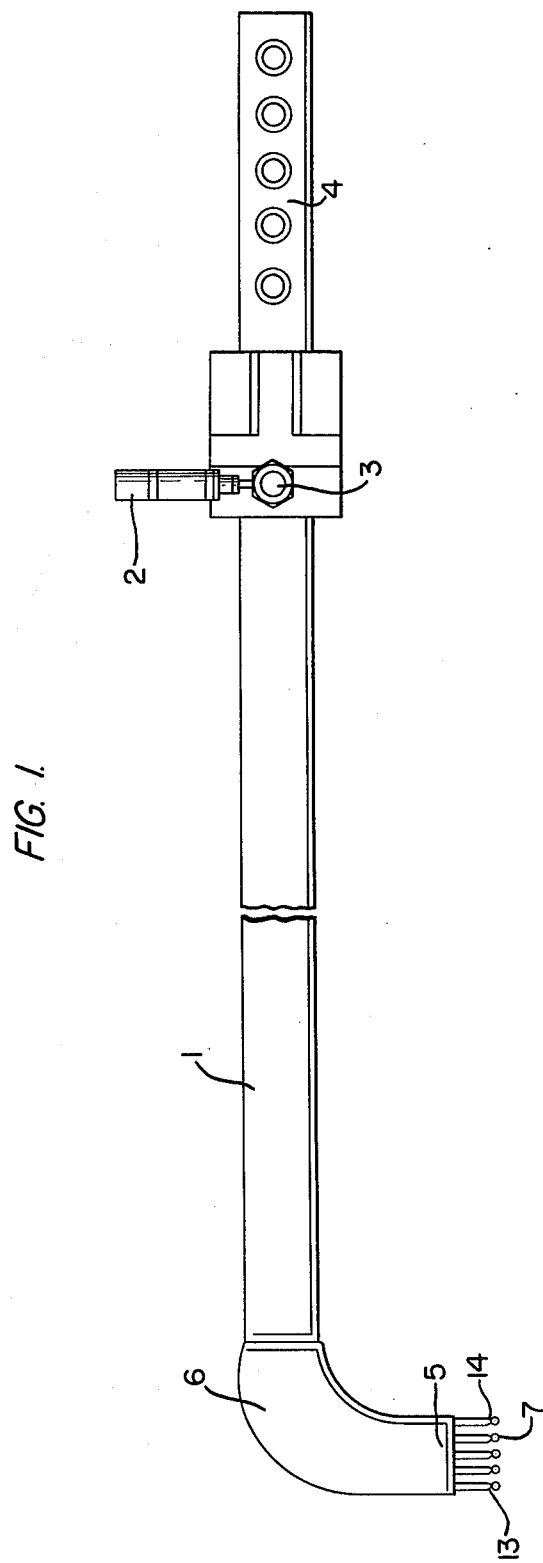
FIG. 1 is a general elevation of a temperature measuring probe in accordance with the present invention.

Referring now to the drawings wherein like reference numerals are used throughout the various views to designate like parts and, more particularly, to FIG. 1, a comb-type temperature measuring probe includes a probe housing having a straight cylindrical probe shank 1 with a connection 2 at a top end thereof for a coolant supply such as, for example, a water supply, and a connection 3 for a coolant discharge with the connections 2, 3 being combined in a block. A coupling 4 is provided for transmitting measured values detected by the temperature measuring probe to indicating and/or control equipment. A terminal member 5 is provided at the other end of the probe shank 1 with the terminal member 5 having a longitudinal axis extending at a right angle to a longitudinal axis of the probe shank 1. The terminal member 5 has a narrow rectangular cross-sectional configuration with a well-rounded arcuate transition member 6 forming a transition from the probe shank 1 to the terminal member 5. The curvature of the transition member 6 is such that a flow of coolant guided in the parts 1, 5 and 6 can be transferred from part 1 to part 5 and vice versa without any tubulence or dead coolant zones. The contour or curvature of the transition member 6 defines the paths of flow of the coolant. Since dead coolant zones would impair the heat transfer, by virtue of the construction of the present invention, a flow contour is provided which ensures a satisfactory laminar flow which, in turn, ensures a good heat transfer at the point of the transition member 6 and, hence, good heat dissipation.

In the illustrated embodiment, the temperature profile of the flow is detected by way of five temperature sensors 7 which are in the form of temperature sensing beads with each temperature sensor 7 being connected to the coupling 4 by way of two precious metal thermo-wires 8, 9.

Figure 2:
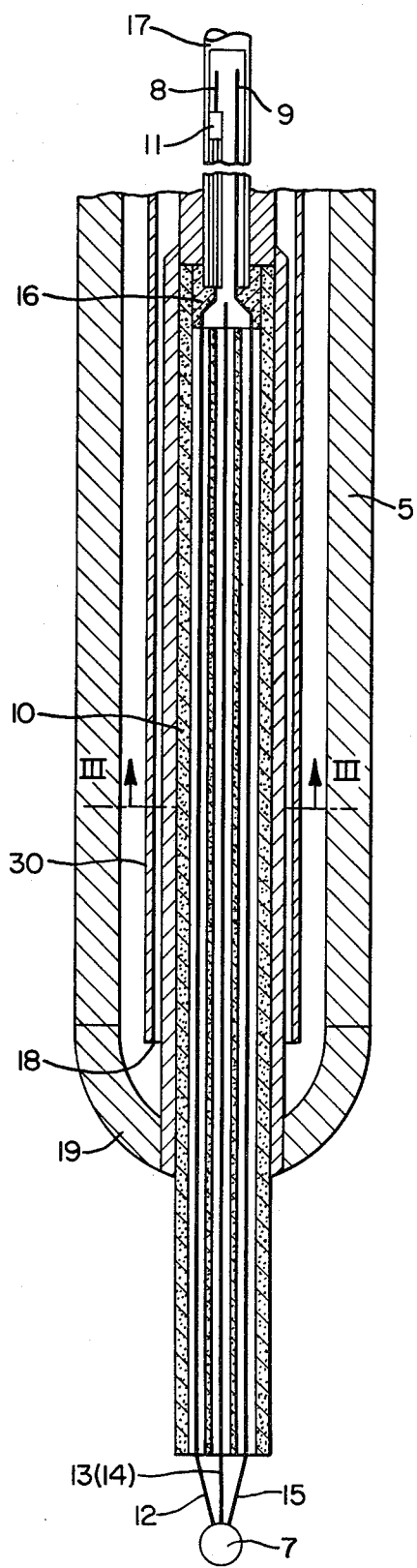
FIG. 2 is a cross-sectional view, on an enlarged scale, of a sensor and associated probe parts of the temperature measuring probe of FIG. 1.
Figure 3:
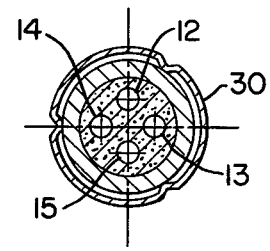
FIG. 3 is a cross-sectional view taken along line III—III in FIG. 2.

As shown most clearly in FIG. 2, each temperature sensor 7 includes two thermo-wires 8, 9 which start from the temperature sensor 7 and extend to and through the terminal member 5 inside a ceramic sleeve 10. Following the ceramic sleeve 10, the two thermo-wires 8, 9 each pass through an inner plastic insulating tube 11 with the tubes 11 extending to the coupling 4 in parallel relationship to the contour of the probe housing. If required, the tubes 11 may be the conventional insulation of the respective thermo-wires 8, 9.

Four support wires 12, 13, 14, 15 are connected at one end to each temperature sensor 7, while the other end of the respective wires 12-15 is held in a head member 16 at the end of the ceramic sleeve 10. Three support wires 12, 13, 14 consist of a platinum-rhodium alloy, with the fourth support wire 15 consisting of pure platinum.

The support wire 15 and one of the other support wires, more particularly, the diagonally opposite support wire 12, are used to transmit the temperature measurements with the support wires 12, 15 being connected to the precious metal thermo-wires 8, 9 in the head member 16. The other two support wires 13, 14, which are also diagonally opposite one another, are purely supporting wires provided only to hold the temperature sensors 7 exactly out in their respective allocated places in the flow of the medium being sensed, even under the influence of the flowing medium and the temperature of such medium.

The temperature sensors 7 extend freely into the medium flow and the ceramic sleeves terminate short of or behind the temperature sensors 7 so that the temperature sensors 7 are freely accessible to the gas flow from all sides.

A jacket or inner tube 17 extends concentrically with clearance around each plastic insulating tube 11 and is, in turn, surrounded with a radial clearance by an outer tube 30. The outer tube 30 has openings 18 at the bottom end thereof which open the outer tube 30 to the interior of the probe housing with the top end of the outer tube 30 being connected to a coolant inlet, while the coolant outlet is connected at the top end of the interior of the probe housing.

The inner tube 17 and outer tube 30 are so arranged and installed in the interior of the probe body that the coolant enters the top end of the outer tube 30 at the coolant inlet and flows through the outer tube 30 the bottom end where it leaves the outer tube 30 and enters the interior of the probe housing, cooling an end face member 19 of the terminal member 5 and continues flowing through the interior as far as the top end of the probe housing and leaves by way of the coolant outlet. In this manner, the entire probe can be subjected to extremely high temperatures since it is cooled sufficiently, including the end face member 19 of the terminal member 5, which would be particularly subjected to the flow of hot gases in, for example, combustion chamber experiments.

To ensure that the temperature sensors 7 freely exposed to the flow of the gases may be well protected against catalytic effect and also to ensure that the effects of noxious substances are kept to a minimum while the technical characteristics remain unchanged and the mechanical strength of the temperature sensor 7 is increased, the temperature sensors 7 are surrounded by a ceramic protective coating of, for example, an aluminum oxide. To ensure good adhesion of the protective coating on the temperature sensors 7, high purity aluminum is applied and is then oxidized to an aluminum oxide.

An advantageous application of the process makes use of the support wires 12-15 of which the two purely supporting wires 13, 14 serve to supply the heating energy, while the other two wires 12, 15 together with a control circuit (not shown) so control the temperature that the aluminum can be applied in a coating thickness which, on the one hand, avoids any appreciable temperature drop while, on the other hand, offers adequate protection for the temperature sensors 7.

In order to protect the bottom end face of the ceramic sleeves 10 from thermal expansion and thus avoid thermal stresses between the probe housing and the ceramic sleeves 10. The sleeves 10 extend through the end face 19 of the terminal member 5 with radial clearance, but without physical contact, the clearance being such that the ceramic sleeve 10 and the end member 19 can expand without stresses in accordance with the differing coefficients of thermal expansion, but the ceramic sleeves 10 do not vibrate due to excessive radial clearance.

The above-noted features of the present invention result in a high accuracy probe of relatively long serviceability. If the temperature sensors 7 are damaged under the influence of extremely high temperatures and have to be replaced, this can be facilitated by connecting the top end of the thermo-wires 8, 9 to the coupling 4 by means of a loop 20. If the temperature sensors 7 have to be changed due to damage or the like, it is only necessary to shorten the loop 20 to pull the thermo-wire 8 or 9 out sufficiently for a new temperature sensor 7 to be fitted.

While we have shown and described only one embodiment in accordance with the present invention, it is understood that the same is not limited thereto, but is susceptible of numerous changes and modifications as known to one having ordinary skill in the art, and we therefor do not wish to be restricted to the details shown and described herein, but intend to cover all such modifications as are encompassed by the scope of the appended claims.

We claim:

1. A temperature measuring probe which includes precious metal thermo-wires arranged in a substantially tubular-shaped probe body, the thermo-wires extending between temperature sensing means exposed to a flow of a hot medium and coupling means for connecting the probe to at least one of indicating means or control means, the coupling means and the temperature sensing means being arranged in parallel planes laterally offset from one another with at least a portion of the probe body extending in a plane of the coupling means, and a terminal member provided at one end of the probe body, a longitudinal axis of the terminal member extending at a right angle to a longitudinal axis of the probe body between the two parallel planes, the probe body being adapted to cool the thermo-wires, characterized in that an arc-shaped transition member is provided between the probe body and the terminal member, the transition member has a substantially round cross-sectional configuration, and in that the terminal member has a shallow rectangular cross-sectional configuration whereby a substantially laminar flow of the coolant through the probe body is achieved.

2. A probe according to claim 1, characterized in that the temperature sensing means includes at least one bead-shaped sensor member exposed to the flow of the hot medium, at least two thermo-wires connected to the sensor member and coupling means, a first tube means for accommodating the thermo-wires, a further tube means surrounding at least a portion of said first tube means, said first tube means and said further tube means being dimensioned and arranged in the probe body so as to define a first space between the first tube means and the further tube means to which the coolant is supplied and a second space between the further tube means and at least a portion of the probe body which serves as a coolant return.

3. A probe according to claim 2, characterized in that means are provided at an end of the probe body remote from the terminal member for supplying and discharging coolant.

4. A probe according to claim 3, characterized in that the terminal member includes an outer end face member, a ceramic sleeve is arranged in the terminal member and extends with a radial clearance through said outer end face member, said ceramic sleeve surrounding said thermo-wires and terminating at a position spaced from the sensor member.

5. A probe according to claim 4, characterized in that the first tube means and the ceramic sleeve have a radial clearance with respect to said further tube means and said end face member so as to be axially displaceable with respect to said further tube means and said end face member.

6. A probe according to claim 5, characterized in that a loop is provided in each thermo-wire in an end adjacent the coupling means.

7. A probe according to claim 6, characterized in that the sensor member is supported on a head member arranged at an end of the ceramic sleeve remote from the sensor member by means of a first pair of support wire means for conducting measured temperature values from the sensor member to the coupling means and a second pair of supporting wire means.

8. A probe according to claim 7, characterized in that one of the first supporting wire means is a platinum wire with the other of the first supporting wire means and the second pair of supporting wire means consisting of a wire of a platinum-rhodium alloy.

9. A probe according to claim 8, characterized in that the sensor member is provided with a coating of ceramic material.

10. A probe according to claim 9, characterized in that the coating of ceramic material consists essentially of aluminum oxide.

11. A probe according to claim 10, characterized in that the probe is constructed as a comb-type probe and includes a plurality of sensor members to which are connected at least two thermo-wires.

* * * * *